Aug. 22, 1950     S. L. SHIVE     2,519,407
CONDUIT TESTER
Filed March 23, 1945

*INVENTOR.*
SCOTT L. SHIVE
BY
*William L. Hall.*
ATTORNEY

Patented Aug. 22, 1950

2,519,407

UNITED STATES PATENT OFFICE 2,519,407

CONDUIT TESTER

Scott L. Shive, Detroit, Mich., assignor to The United States of America as represented by the Secretary of War Application March 23, 1945, Serial No. 584,471

6 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

The invention to be hereinafter described relates to conduit testing devices and more particularly to equipment for testing the radio frequency shielding efficiency of a conduit.

In so far as applicant is informed, prior to this invention, there has existed no commercially practicable method, means, device, equipment or apparatus for satisfactorily testing or evaluating the radio frequency shielding efficiency of a conduit. Thus, while the shielding requirements or extent of shielding or the degree of shielding desired might all be accurately known for a given installation or project it could not be readily and satisfactorily determined in advance, whether a proposed conduit would closely approximate the desired results.

The present invention has been developed to provide a simple, compact and efficient piece of equipment, apparatus or device, readily produced from easily available material, instruments and parts and constantly instantly available to accurately determine the radio frequency shielding efficiency of a short length of any given conduit.

In order to more clearly disclose the construction, operation and use of the invention reference should be had to the accompanying drawings forming part of the present application.

Throughout the several figures of the drawings like reference characters designate the same parts in all of the different views.

In order to adequately test and determine the shielding efficiency of a given section or length of conduit that conduit section should be submitted to such radio frequency as it is intended to protect or shield against and its reaction adequately determined. That is a purpose and function of the equipment of this invention.

Referring to the accompanying drawings, 1 is a test chamber of suitable shape and proportions or dimensions. It is provided with a suitable cover on top, not shown in drawings and which may or may not be suitably hinged thereto. In any event, it is so disposed that it may be operated to open and close the test chamber. The chamber, including the top, may be made of sheet iron or it may be of any desired material presenting, as nearly as practicable, a complete radio frequency shield between possible interrupting elements from without.

Figure 2:
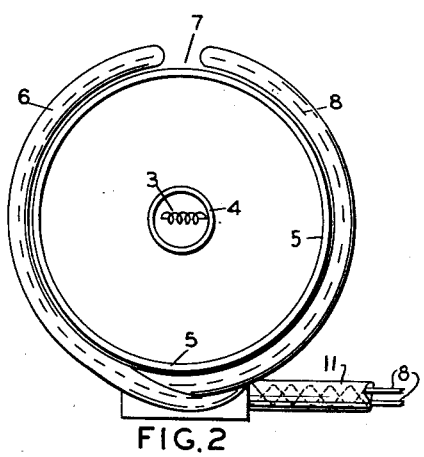
Fig. 2 is an end view of the pick-up loops, shown in Fig. 1 looking toward the radiating coil.
Figure 3:
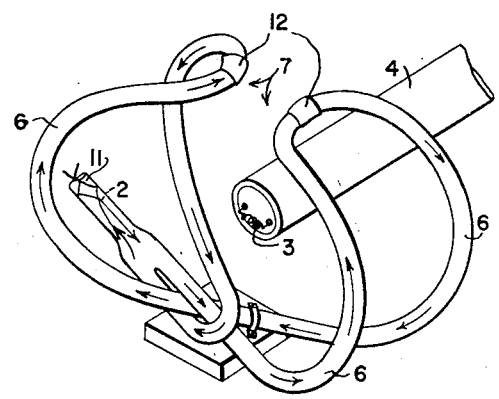
Fig. 3 is a perspective view of the loop structure shown in Fig. 1 with the supporting cylinder removed.
Figure 4:
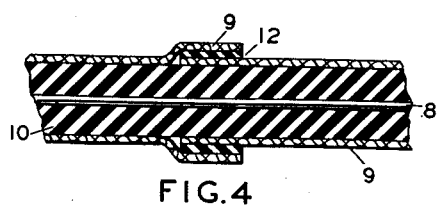
Figure 4 is an enlarged detail of a section of the loop structure indicating the method used for breaking the outside casing to reduce electrostatic influence and after the style of a Faraday shield.

Within this chamber at one end thereof is suitably mounted the twisted pair of wires 2 having a loop formed as a radiating coil 3. This coil 3 is preferably disposed in the position of alignment shown in Fig. 2. By repeated tests it has been found that the number of helices or turns in coil 3 affects its sensitivity, the sensitivity increasing as the number increases. These wires are thoroughly shielded by the tube 4 of brass or other suitable shielding material. Tube 4, preferably, extends substantially the full length of wires 2 from the chamber wall to but not including coil 3. As a protection against damage in use, any suitable mechanical shield may be applied over or around coil 3, though such is not essential. In case of tests with very high frequencies, the shield of the Faraday type is desirable over the coil itself, but for normal test frequencies (500 kc. to 150 megacycles) such is not necessary.

About coil 3 is suitably disposed a cylindrical tubular probe supporting cylinder 5 of insulating material, so arranged that its longitudinal axis is approximately aligned with that of the tubular shield 4 while its middle diameter is approximately aligned with the longitudinal axis of coil 3. Likewise, in assembled relation, coil 3, preferably, should be disposed at the approximate center of tubular support 5 both longitudinally and diametrically.

About the support 5 are disposed the loops 6 of the pick up wire of the probe. In the drawings illustrating the invention, one such loop is shown extending about either side of the support 5. They cross one over the other at the lower side and under the approximate longitudinal center of the tubular support while at the diametrically opposite point of the support they are slightly spaced as at 7. These loops may be of well known coaxial wires comprising a single solid copper central conductor or copper tubing 8 and an outer braided conductor 9, with the usual insulation or dielectric 10 between. The conductor 9 however is broken at 12 to provide unimpeded electromagnetic coupling.

In disposing loops 6 about the tubular support 5 care must be taken to see that the electrical direction of one loop is the same as that of the other so that they will cooperate in their pickup and their total effect will be additive. If the conductor of one loop is directed oppositely in an electrical sense, to that of the other, as one having a right hand turn and the other having a left hand turn, they will, when assembled about tubular support 5, have a neutralizing effect resulting in no pick-up by the probe and rendering the equipment wholly inoperative. Actually the loops are as one loop, since the same conductor runs in both in series, so arranged that the pick-up current induced runs in the same direction throughout, from one end to the other.

The two ends of the conductors 8 of the Faraday shielded loops 6 are brought out together and led to the indicating and measuring means 15 through the copper shielding tube 17. They are twisted together after they leave the loops and travel side by side, to provide for a neutralizing effect until they reach the wall of the chamber 1. One side is grounded there, the other side consisting of the conductor 8 in its insulation 10 and tubing 17 is carried through the metal wall of the test chamber, and continues to the metering network in 14 and 15.

Figure 1:
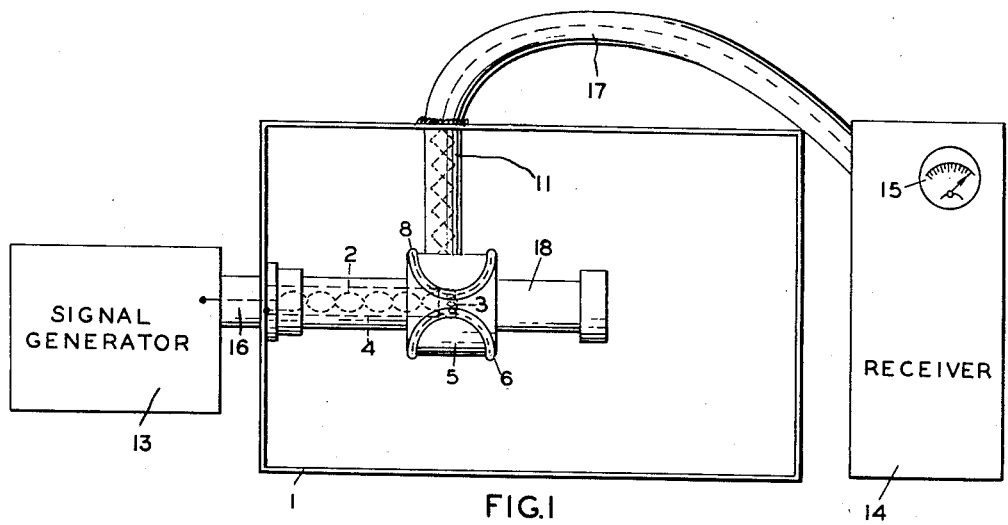
Fig. 1 is a diagrammatic view, with top or cover of test chamber removed of a tester embodying this invention.

The loops are spaced apart at 17 as indicated in Fig. 1. They are formed arcuately to encompass the sample shield material to be tested, with the radiating coil 3 centrally located within the latter. Any leakage of lines of force through the shield will pass through and electrically cut the conductors within the loops.

At 7, the point of nearest approach of loops 6, or the apexes, each loop is gapped or split through as at 12, and insulation placed therebetween to permit unimpeded electromagnetic pick-up and still shield the insulated conductor against unwanted electrostatic coupling. This gap may be provided in any one of several ways.

While the radiating element has been illustrated and described as internal relative to the conduit sections and the probe and pick-up external it is to be understood that a reversal of the relative positions of the parts is equally well intended and is to be included within the scope of this invention. In both such arrangements, the radio frequencies would pass through the conduit wall and its shielding properties would be indicated by the readings on 15. The signal generator and the receiver would be interchanged to correspond with the reversal. Such reversal of parts would involve no rearrangements, modifications, substitutions or other changes beyond those readily understood by those skilled in the art and therefore, need not be fully detailed in this application.

The complete and fully assembled equipment also comprises a signal generator 13 connected in well known manner to the twisted pair 2 and coil 3, a receiver 14 similarly connected to the twisted pair 8 and an output indicator 15 associated with the receiver. The connection shown in the drawings, as between generator and twisted pair, is through a shielding tube 16, similar to tube 4, with proper insulation completely shielding that part of 2 leading from 1 into 13. The other branch of 2 is simply grounded in the adjacent end wall of 1. Likewise, the connection between the twisted pair 8 and the receiver is through a shielding braid or copper tubing 17 with proper interposed insulation, the remaining branch of 8 being grounded in the adjacent side wall of the chamber.

With the equipment arranged, assembled and connected as herein above set forth a signal generated by 13 would be radiated by 3, picked up by the probe loops 6, received by 14, and the output thereof indicated by 15. That would represent radiation entirely free from any interposed shield, screen or obstruction, such as conduit section 18.

In the operation of the device the coil 3 sends out its lines of force spreading from one end of the core space within outwardly over the coil and back into the other end in circuit manner. These lines will extend out and cut the loops and induce a current therein that will flow into the signal receiving network and meter it. If a "good" sample tubular shield is placed over the coil so as to encompass it, it will obstruct the lines of force and prevent them reaching the loops, so that no recording on the receiving network will be shown. If the shield, however, is not "perfect," it will permit some lines to pass through to the loops, and induce a current therein and in proportion to their relative flux value, will give a recording on this network.

Any material having an appreciable conductivity when interposed between the radiating coil and the cooperating pick-up portion of the probe will have a damping, shutting out or shielding effect. So, the usual tubular conduit of whatever lateral cross section, slipped over the radiating coil 3 and along tube 4 toward the adjacent chamber end will shield or shut out from the pick-up portion of the probe a certain proportion of the radiations from 3. Radio frequency radiations will pass from the enclosed coil 3 through the conduit wall to a greater or less degree, depending to a great extent upon the frequency used, the material of the conduit wall and the percentage of imperfections in that wall. A given radio frequency will pass through various conduit walls in correspondingly varying proportions, percentages, degrees or extents. Likewise, the extent to which the conduits prevent passage or their shielding effect will vary, the variation corresponding but in, approximately, reverse order to those above.

While conduits have been mentioned, it is to be understood that practically any tubular article or construction is intended as within the scope of this invention regardless of the use to which it is to be put and regardless of its dimensions, provided that such dimensions are not prohibitive to the use of the equipment of this invention.

It hardly need be stated, and seems obvious from the drawings, that the conduit section or other tubular object is simply slipped longitudinally over coil 3 and along the shielding tube 4, toward the adjacent chamber wall, being adequately supported in place by that tube.

A short bracket or any other suitable support for this cylindrical probe support 5 may be used, extending upwardly from below or inwardly from one side of the chamber, as may be desired. The preferred procedure in determining shielding efficiency of a given conduit is to place a section of the conduit over the coil 3, then increase the output of the signal generator until a convenient reading is obtained on 15, noting at this time the output reading of the signal generator, then removing the conduit section and reducing the signal generator output until the reading of 15 is the same as before. The ratio of the two readings of the signal generator output represent a measure of the shielding efficiency of the conduit section. Or, alternatively, by passing a given radio frequency current first through the coil 3 without any shield and then through a coil 3 with the selected conduit section 18 acting as a shield, the respective readings of indicator 15 show the shielding effect of section 18. And, as will be readily understood, reference tables may be compiled by running a number of similar tests on a number of conduit sections each of known characteristics and those tables used as guides in testing other conduit sections for acceptance or rejection or for other purposes.

It is thought that the construction, operation and use of the invention will be clear from the preceding detailed description.

Changes may be made in the construction, arrangement and disposition of the various parts of the invention within the scope of the appended claims without departing from the field of the invention and it is meant to include all such within this application wherein only one preferred form has been illustrated purely by way of example and with no thought or intent to, in any degree, limit the invention thereby.

Having thus described my invention, what I claim and desire to protect by Letters Patent is:

1. In combination with a high frequency signal transmission signal network and a signal receiving network, a tester of shielding comprising, a radiating coil of helical form having leads connected therewith for coupling it to said transmission network, a conductor comprising at least two loops, each of said loops spaced a predetermined distance from said coil but encompassing same substantially all around and so disposed as to have said conductor electrically impressed by the lines of force from said radiating coil to induce current therein, the apexes of said loops being oppositely disposed and spaced apart a predetermined distance leads connected with said conductor adapted for coupling to said receiving network, means for supporting said coil and loops in operative position and for receiving a sample of the shielding to be tested in the area permeated by said lines of force between the coil and said loops, whereby the amount of its obstruction to the flux from the coil will be indicated by said receiving network.

2. In combination with a conventional high frequency signal transmission signal network and a conventional signal receiving network, a tester of cylindrical shielding comprising, a radiating coil of helical form having leads connected therewith for coupling it to said transmission network, a conductor comprising at least two loops, each of said loops spaced a predetermined distance from said coil but encompassing same substantially all around and so disposed as to have said loops electromagnetically impressed by the lines of force from said radiating coil to induce a current therein, the apexes of said loops being oppositely disposed and spaced apart a predetermined distance, leads connected with said loops adapted for coupling to said receiving network, means for supporting said coil and loops in operative position and for receiving a sample of the shielding to be tested in the area permeated by said lines of force between the coil and said loops, whereby the amount of its obstruction to the flux from the coil will be indicated by said receiving network, and means for shielding the loops electrostatically and the leads thereto electromagnetically.

3. Testing equipment of the character described comprising a shielded testing chamber, a source of signal radiation therein, a signal generator connected to said source, a pick-up probe within said chamber disposed in the electromagnetic field radiated by said source and comprising at least two loops of a shielded conductor wound in the same direction, each of said loops being arcuate and provided with a gap therein to permit unimpeded electromagnetic pick-up, the apexes of said loops being spaced from each other a predetermined distance, means for supporting a test object in the radiation path between said source and said pick-up probe to measure the shielding efficiency thereof, and an indicator means coupled to said probe for indicating the shielding efficiency of said object.

4. Testing equipment of the character described comprising a shielded testing chamber, a radiating coil disposed therein, a signal generator having its ouput connected to said coil, a cylindrical tubular support made of insulated material mounted within said chamber and encompassing said coil, said coil being centrally disposed within said tubular support and having its longitudinal axis transverse to the axis of said cylindrical support, a pick-up probe comprising at least two loops of a single shielded conductor wound in the same direction, said loops extending circumferentially of said tubular support toward each other, the apexes of said loops being spaced from each other a predetermined distance, each of said loops having a gap therein to permit unimpeded electromagnetic pick-up, means for supporting a test object in the radiation path between said coil and said pick-up probe to measure the shielding efficiency thereof and an indicator coupled to said probe to indicate the shielding efficiency of said object.

5. Testing equipment of the character described comprising a source of radio frequency voltage, a shielded testing chamber, a radiating coil and a conductor disposed within said chamber, said coil terminating said conductor at one end thereof, the other end of said conductor being connected to the output of said voltage source, a shield encompassing said conductor for substantially the full length thereof within said chamber, a pick-up probe disposed in an electromagnetic field radiated by said coil and comprising at least two loops of a shielded conductor wound in the same direction, each of said loops being arcuate and having a gap therein to permit unimpeded electromagnetic pick-up, the apexes of said loops being spaced from each other a predetermined distance, means for supporting said loops, means for supporting a test object in the radiation path between said coil and said pick-up probe, and indicator means coupled to said probe to indicate the shielding efficiency of said test object.

6. Testing equipment of the character described as set forth in claim 1 wherein each of said loops has a structure of arcuate form.

SCOTT L. SHIVE.

REFERENCES CITED

The following references are of record in the file of this patent:

UNITED STATES PATENTS

| Number | Name | Date |
| --- | --- | --- |
| 1,474,382 | Round | Nov. 20, 1923 |
| 2,181,149 | Peters et al. | Nov. 28, 1939 |
| 2,312,687 | Curtis | Mar. 2, 1943 |
| 2,378,928 | Johnson, Jr. et al. | June 26, 1945 |
| 2,388,049 | Goode | Oct. 30, 1945 |
| 2,390,489 | Archenbronn | Dec. 11, 1945 |

OTHER REFERENCES

Bureau of Standards Research Paper No. 158, (Reprint from Bureau of Standards Journal of Research, vol. 4, Mar. 1930), pages 423 and 424.